United States Patent Office 3,562,037

Patented Feb. 9, 1971

3,562,037

CONTINUOUS METHOD OF PRODUCING INDEFINITE LENGTHS OF FLEXIBLE FLAT ELECTRICAL CONDUCTORS

Lawrence R. Travis, Brockton, Mass., assignor to Electro Connective Systems, Inc., Brockton, Mass., a corporation of Massachusetts Filed July 7, 1967, Ser. No. 651,899
Int. Cl. B46c *1/22;* C23f *1/04*
U.S. Cl. 156—3 3 Claims

ABSTRACT OF THE DISCLOSURE

Method of continuously producing indefinite lengths of flexible flat multiple electrical conductors from a web wherein parts of the conductors are exposed for electrical connections, the method including the provision of a control band which is sensed to control the alignment of the web and to control the accurate coating of the conductors to provide a predetermined exposed conductor pattern.

This invention involves a method for automatically and continuously providing an encapsulation of indefinite lengths of flexible flat multiple electrical conductors with a dielectric material, the material being applied as a liquid in a controlled fashion to provide uncapsulated areas accurately located to facilitate reliable electrical connection thereto.

The primary deterrent to a widespread use of flat flexible conductor cable or printed circuits is believed to be the lack of adequate and reliable termination. Considerable difficulty has been encountered in the selective removal of portions of insulation from the cable for purposes of termination. Methods which can be viewed as subtractive in nature have been tried involving mechanical and chemical removal or displacement of insulation.

This invention employs a method which can be viewed as additive, as opposed to subtractive, in nature, since no removal of insulation is required. Instead, the insulation is deposited on the printed circuit or cable in a selective manner leaving predetermined areas uncoated.

The instant invention enables the manufacture of indefinite lengths of cables by a technique involving spaced coating stations, one station applying a complete coverage for fully encapsulating the conductors and the other station applying a coating of a preselected pattern which may leave a transverse band across the web uncoated, leave discrete areas uncoated, and the like.

An advantage of the instant method is that it avoids the very difficult problems encountered due to lack of dimensional stability of dielectric materials in methods using pre-formed encapsulating layers which are laminated to the web, openings in the pre-formed layer providing access for electrical connections. Such pre-formed layers, particularly in continuous processes involving extremely long cables cause many problems due to variations in dimensions which result in poor registration of the openings in the pre-formed layer with the desired portions of the conductors. The instant invention employs highly refined coating techniques, such as, offset printing and the like, whereby the location of the interruptions in the coating can be precisely controlled.

Full area coating of insulation on the conductor side of the web can be accomplished by the application of an insulation resin either in the form of a hot melt or in solution with a solvent by means of an application roller to which the liquid is supplied by doctoring, offset, multiple roller trains and the like. As an alternative technique, spray coating can be employed for the full or complete coating step.

Selective area coating of the dielectric material may be accomplished by an application roller, the surface of which carries a depression pattern corresponding to the uncoated area pattern desired.

The technique includes the steps of providing a control band on the web for triggering the coating action at the stations in accordance with a desired pattern. In this manner accurate registration of the coatings can be attained. Preferably the reference indicia for controlling the coating sequence is in the form of an interrupted band along the web and accurately positioned thereon so that it can also be sensed to maintain accurate transverse alignment of the web. The interruptions in the control band are of predetermined lengths designed to control the coating operation without affecting the accurate transverse alignment control of the web. Variation in the pattern of the control band can be employed to conform to the sensing requirements of both the coating system and the transverse alignment system. Preferably, the single interrupted band which serves both systems is located along a side of the web.

For a more complete understanding of the practical application of this invention, reference is made to the appended drawings, in which.

Figures 1, 2, 3, 4:
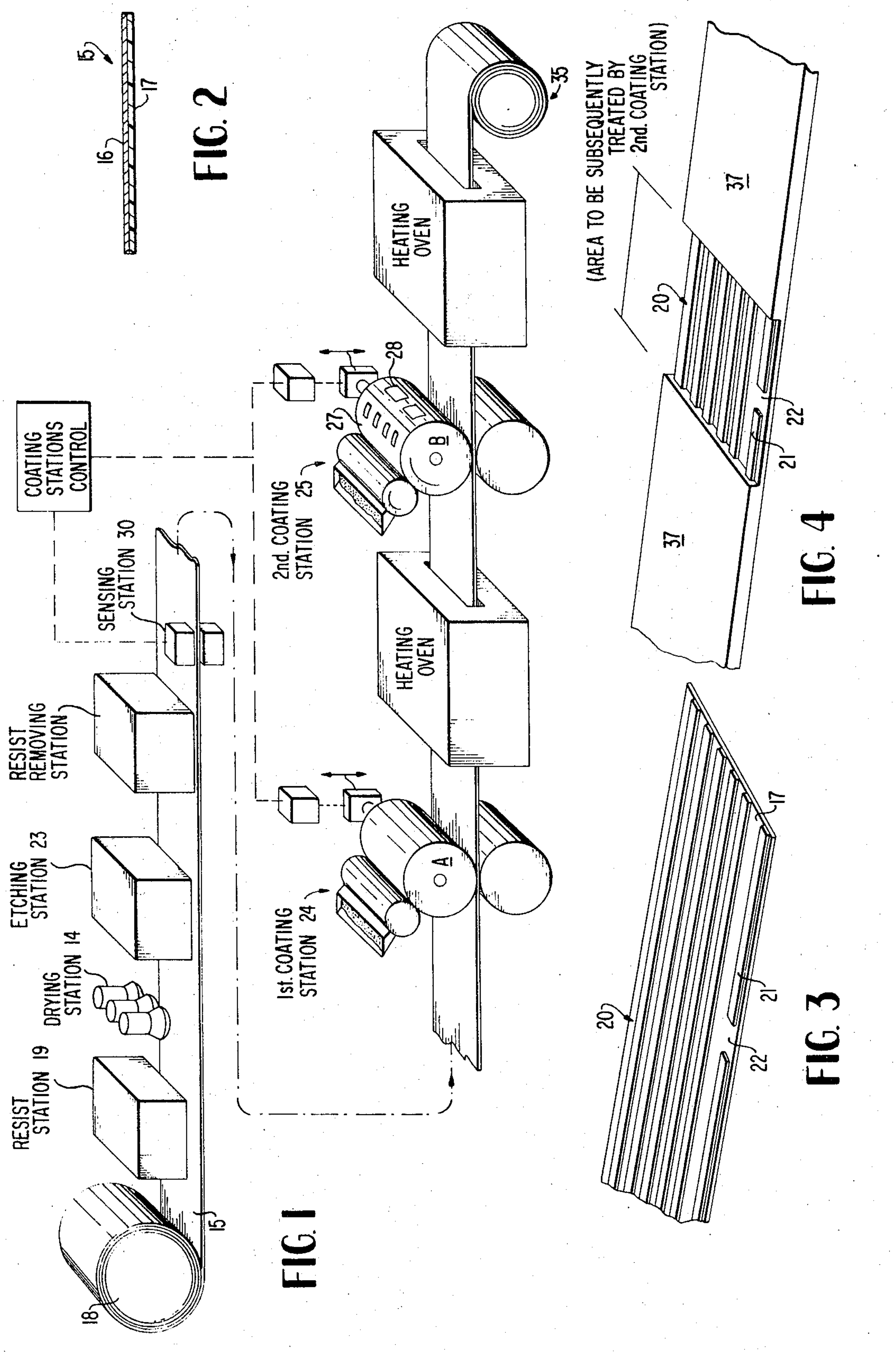
FIG. 1 is a schematic flow diagram of the steps of the method.
FIG. 2 is a cross-section of the web prior to resist application.
FIG. 3 is a perspective view of the web after etching showing the multiple conductors and the control band.
FIG. 4 is a perspective view of the web after the first coating station.

Web 15, which has a top metal foil layer 16 and a bottom electrical insulation layer 17 (FIG. 2), is fed from roll 18 to the resist station 19 and its drying station 14, where the desired conductor pattern 20 is applied. Preferably, the control band pattern is applied to the edge of the web at this station in the form of an interrupted longitudinal control band 21 with spaces or open segments 22.

The web 15 then passes through the normal processing stations (FIG. 1) such as the etching station 23 and then on to the two coating stations 24 and 25, where the roller A of first station 24 completely coats and encapsulates desired longitudinal portions of the web and roller B of the second station 25 coats only a portion of the web. The rollers apply an insulation material in liquid form, such as a resin which is fluidized by heat or mixture with a solvent.

Preferably, roller B carries two or more replaceable impression plates 27 and 28 (FIG. 2) so that a selection can be made of the coating pattern to be applied. A sensing station 30 positioned immediately prior to the first coating station 24 surveys the interrupted longitudinal control band 21 formed during the resist printing and etching steps and, through suitable amplifying and control means, causes the actuation of rollers A and B in accordance with a predetermined sequence. It will be understood that such equipment will be synchronized to sequentially index the rollers into coating position as desired and also to rotate roller B to the starting point of an impression plate 27 having the desired pattern. Such coordination of movement in response to the sensed signal would, of course, involve predetermined timed programming of events. The longitudinal band 21 is preferably formed by the metal foil layer 16 with the longitudinal open segments 22 between segments of the line. The length of the open segment 22 between band segments 21 may be varied and keyed to the impression plates 27 so that on sensing a space of a certain length, roller B will be rotated to present the keyed impression plate 27 to the web for the coating step. The lengths of open segments 22 are such that the transverse adjustment control of the web as it passes through the coating stations is not affected.

When producing cables of significant length, the sensing step will include a counting of the repetitive pattern of the control band 21, thereby enabling the complete encapsulation of the multiple conductors 21 by roller A for a predetermined length of cable, followed by the application of a terminal coating pattern with uncoated areas by roller B.

The fact that the control band 21 is formed at the same time as and is in precise relationship to the multiple conductor pattern, permits precision indexing of the rollers A and B. The dimensional relationship between the control band 21 and the conductors 20 is extremely accurate; in fact, as accurate as between any two portions of the same original master art work. Registration, therefore, of the terminal transverse coating deges formed by rollers A and B can be precisely controlled to insure accurate alignment and fusing for continuity of coating.

The accurate transverse alignment of the web through the coating stations can be controlled by the usual conventional web guide mechanisms, preferably in response to the control band 21, this band thereby serving both as a base reference for aligning the web and as a control for the coating operation.

Figure 5:
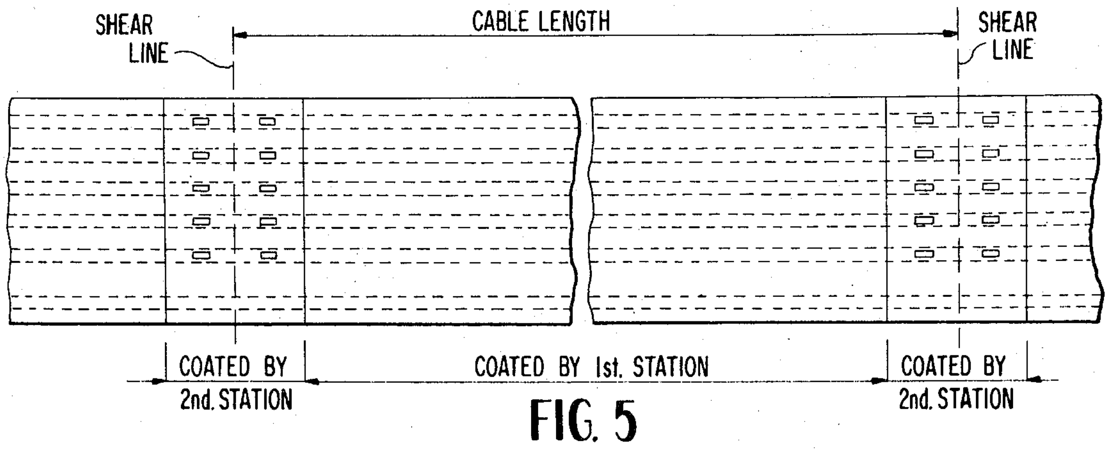
FIG. 5 is a top view of the web after the second coating station showing discrete termination openings.
Figure 6:
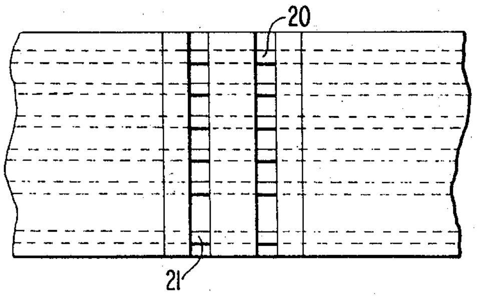
FIG. 6 is a top view of a web having transverse termination openings.
Figure 7:
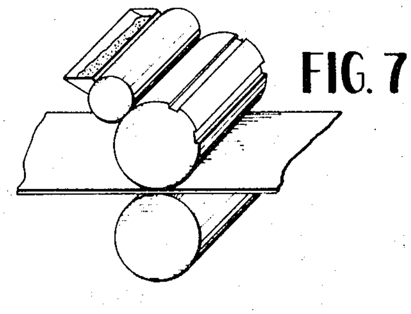
FIG. 7 is a perspective view of a system for providing the transverse termination openings of FIG. 6.

The etched web of FIG. 3 when spray coated or coated by roller A to completely encapsulate the base metal conductors and control band, appears as seen in FIG. 4 with a wide distance between the transverse ends of the coating 37. The second coating application by plate 27 of roller B of FIG. 1 produces the pattern shown in FIG. 5 with a sound and accurate fusion of the additional material to the coating 37. A transverse shear line is shown to indicate the division between discrete cables. FIG. 6 shows another form of termination coating accomplished by the roller system of FIG. 7 whereby a pair of transverse paths are left bare for easier access to the conductors.

While the method preferably includes application of resist to a continuously moving web in a predetermined manner, etching, resist removal, and related treatment steps, the preliminary steps by which the foil circuit configuration and control band 21 are formed can be varied and need not include etching and the like. Fundamentally the method of the invention resides in sensing the control band 21, and actuating the coating rollers A and B in accordance wtih a predetermined sequence responsive to the sensing. The resultant encapsulated cable can then be coiled on take-up roll 35.

The method of the instant invention can be effectively conducted by utilizing a conventional web drive mechanism which faithfully moves the web at a constant velocity. The sensing of an open segment 22 would then be used to initiate the indexing of roller A out of coating position for a preset time period, the indexing of roller B into coating position, and a return of each roller to its initial position. Depending on the distance between the coating stations, both coating rollers may be coating at the same time.

Figure 8:
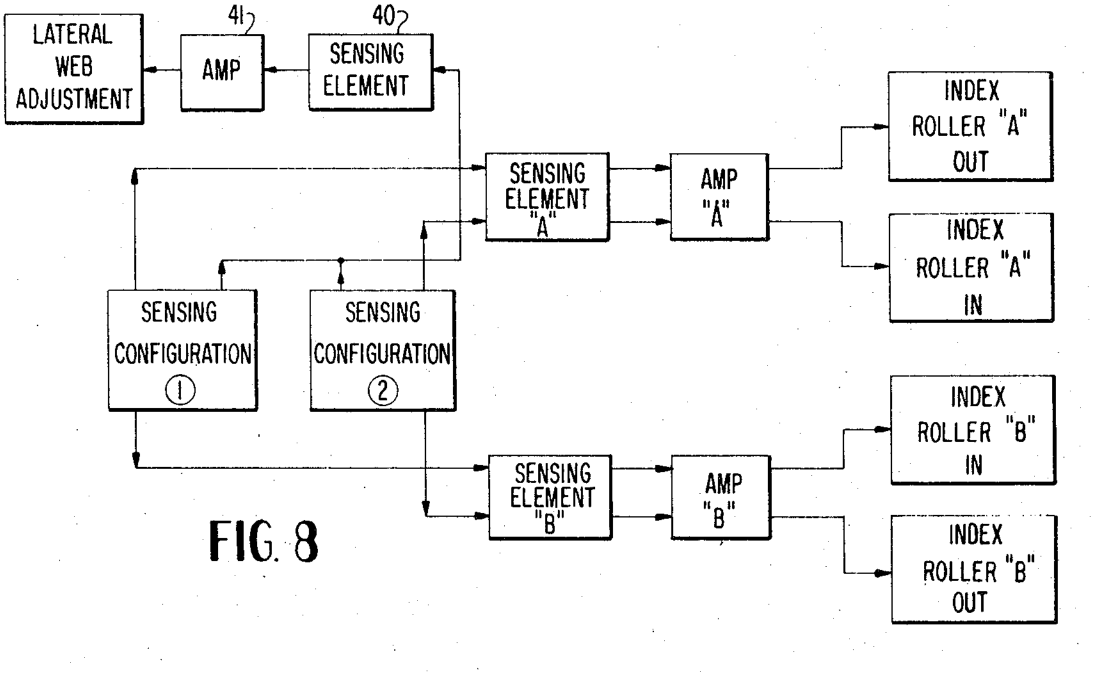
FIG. 8 is a diagram of a control system which senses two types of configurations to operate the coating devices.

In some instances where, for example, the distance between coating stations is significant, precise coating is preferably accomplished by a multiple sensing of the control band, that is, an actuation of the rollers between non-coating and coating positions in response to the sensing of indicia on the web for each event. Such a system is shown in FIG. 8. Lateral sensing means 40 with its amplifier 41 controls the lateral position of the web through the coating stations. Roller A is indexed into and out of coating position in response to the sensing of open segments of the control band; similarly, roller B has its own sensing and indexing system for determining the timing and duration of its movement in response tc the control band.

The sensing step may be accomplished in a number of ways, for example, a photoelectric unit may monitor or survey the control band and responses therefrom amplified to cause minute transverse alignment of the traveling web and coating sequence actuation. Similarly, the interrupted conductivity of the band may be used as a switching element for the same purposes.

I claim:

1. A method of continuously producing indefinite lengths of encapsulated flexible flat multiple electrical conductors wherein certain predetermined portions of the multiple electrical conductors are exposed to facilitate electrical connection thereto, comprising:

(a) continuously applying resist to the exposed surface of a metal foil layer of a web comprising a layer of metal foil and a flat layer of dielectric material on the other surface of said metal foil layer to produce a desired multiple electrical conductor pattern and a pattern for a lateral alignment and coating control band, (b) continuously removing the portion of the metal foil layer to which resist has not been applied, (c) continuously removing the resist to uncover and expose the control band and the multiple electrical conductors thereby formed, (d) simultaneously forming a flat lateral alignment and coating control band on said side of said layer along the length thereof and having a predetermined lateral position with reference to said conductors and a longitudinal signal pattern, (e) continuously sensing said control band, (f) thereafter continuously passing said web through a first coating station and a second coating station while continuously adjusting said web transversely as it moves through said stations in response to the sensing of the lateral position of said control band to maintain accurate lateral alignment, and (g) continuously coating the web on said surface of said dielectric layer and on said conductors with liquid dielectric material selectively at the first station and at the second station in predetermined programmed response to said sensing of the signal pattern of said control band, the coating at one of the stations completely encapsulating portions of the multiple electrical conductors and the coating at the other station partially encapsulating other portions of the conductors in accordance with a predetermined design to leave uncoated said certain predetermined areas of the conductors.

2. A method as defined in claim 1 and wherein said resist is applied to produce a pattern for a control band along a side edge of the web having distinguishing features which can be accurately sensed to control the coating steps as well as the transverse adjustment of the web during the coating steps.

3. A method as defined in claim 2 and wherein said resist is applied to produce a pattern for a control band made up of spaced segments along the side edge of the web, the spaces between the segments being of predetermined length such that the transverse adjustment control is not affected.

References Cited

UNITED STATES PATENTS

| | | | |
|---|---|---|---|
| 2,840,370 | 6/1958 | Noble | 226—28 |
| 2,849,298 | 8/1958 | Wetbering | 156—3 |
| 3,442,001 | 5/1959 | Canteloube | 29—407 |
| 3,237,973 | 3/1966 | Rumberger | 29—625 |
| 3,455,751 | 7/1969 | Frantzen | 156—3 |

ROBERT F BURNETT, Primary Examiner

R. J. ROCHE, Assistant Examiner

U.S. Cl. X.R.

101—177; 118—7; 226—15; 156—8, 47